United States Patent
Ito

(10) Patent No.: US 7,341,418 B2
(45) Date of Patent: Mar. 11, 2008

(54) VEHICLE EQUIPPED WITH LIFT DEVICE AND LIFT DEVICE

(75) Inventor: Hideaki Ito, Maebashi (JP)

(73) Assignee: Sato Kogyosyo Co., Ltd., Maebashi-shi (JP)

(*) Notice: Subject to any disclaimer, the term of this patent is extended or adjusted under 35 U.S.C. 154(b) by 147 days.

(21) Appl. No.: 11/341,076

(22) Filed: Jan. 27, 2006

(65) Prior Publication Data
US 2007/0104561 A1 May 10, 2007

(30) Foreign Application Priority Data
Nov. 4, 2005 (JP) ............................. 2005-320611

(51) Int. Cl.
*B62D 43/00* (2006.01)
(52) U.S. Cl. ..................... 414/466; 414/469
(58) Field of Classification Search ............... 414/462, 414/465, 466, 469; 296/3; 224/309, 310; 212/180
See application file for complete search history.

(56) References Cited

U.S. PATENT DOCUMENTS

| | | | | |
|---|---|---|---|---|
| 3,141,565 A | * | 7/1964 | Cain | 414/462 |
| 5,209,628 A | * | 5/1993 | Hassell | 414/462 |
| 5,518,357 A | * | 5/1996 | Ziaylek | 414/462 |
| 5,884,824 A | * | 3/1999 | Spring, Jr. | 224/310 |
| 6,099,231 A | * | 8/2000 | Levi | 414/462 |
| 6,427,889 B1 | * | 8/2002 | Levi | 224/315 |
| 7,077,617 B2 | * | 7/2006 | Itoh | 414/680 |
| 7,111,765 B1 | * | 9/2006 | Blakley | 224/506 |
| 2003/0175101 A1 | * | 9/2003 | Levi | 414/462 |
| 2006/0280583 A1 | * | 12/2006 | Settelmayer et al. | 414/462 |
| 2007/0090139 A1 | * | 4/2007 | McKenzie | 224/310 |

FOREIGN PATENT DOCUMENTS

EP        461709 A1 * 12/1991

OTHER PUBLICATIONS

English abstract of Japanese Patent Application 2001-163599-A.
English abstract of Japanese Patent Application 2004-182363-A.

* cited by examiner

*Primary Examiner*—Saul Rodriguez
*Assistant Examiner*—Joshua I Rudawitz
(74) *Attorney, Agent, or Firm*—Townsend & Banta

(57) ABSTRACT

A lift device, comprising link units and a drive source, for operating these link units, is provided on the top of a vehicle or high surface. The link units comprise a telescoping arm that is disposed in a reclined posture on a top of the vehicle or high surface, a boom that is swung up and down by the drive source, a slide beam that is moved by the swing movement of this boom, along the top of the vehicle or high surface, and arm telescoping means for telescoping the telescoping arm in response to the swing movement of the boom. The telescoping arm comprises a first arm member, having an end that is rotatably connected to a free end of the boom, and a second arm member that is mobile in the lengthwise direction of the first arm member, the first arm member being oriented upwards so as to be lowered while extending from the top of the vehicle, as a result of the swing movement of the boom.

4 Claims, 7 Drawing Sheets

FIG. 3

VEHICLE EQUIPPED WITH LIFT DEVICE AND LIFT DEVICE

FIELD OF THE INVENTION

The present invention relates to a lift device that allows for quick and easy loading and unloading of objects disposed on a high surface; and more specifically to a vehicle having a lift device, and to a lift device suitable for use with objects which are large with respect to the top of the vehicle.

BACKGROUND OF THE INVENTION

High surfaces, which represent dead space, are commonly advantageously used for storage of objects of various different types. For example, it is common for rescue ladders and folding boats to be mounted on the top of firefighting vehicles; and for these devices to be used in rescuing people. However, each time that such objects are loaded or taken down from these high places, it is necessary to go up to this high surface and pass the objects up and down, which is troublesome and may be dangerous. There is a particular problem in the case of ladders and boats for rescue purposes mounted on the top of vehicles, since it is not possible to take these down quickly, even if there is an urgent need to use the ladder or boat.

Lift devices can also be used for loading and unloading non-emergency objects. Conventional lift devices for such use generally use hydraulic systems or the like to move loading platforms straight up and down. With such conventional type of lift device, it is necessary for a person to move the objects between the loading platform and the high surface. Furthermore, crane systems are capable only of reducing human labor, and cannot be expected to greatly reduce the time required for loading and unloading, and so these systems are not suitable for firefighting and the like, where speed is important.

Japanese Patent No. JP-3380199-B and Japanese Laid Open Patent Application No. JP-2004-182363-A describe the development and use of a lift device in which a long carrier that bears various types of objects is lowered at an inclination from a high surface, such as the top of a vehicle, by swinging (rocking up and down) a swing arm. However, while the lift device of Japanese Patent No. JP-3380199-B is useful in that it allows objects such as rescue ladders used by firefighting vehicles and the like to be quickly and easily loaded or unloaded without going up onto the top surface of the vehicle, when the length of the carrier is increased to accommodate the loading of long objects, the length of the swing arm (which corresponds to the boom in the present invention) must be increased by a corresponding amount. This presents a problem in that the swing radius of the swing arm increases so that, when working in an enclosed space having a low ceiling or beneath overhead wires, the swing arm or the top of the carrier may collide with obstacles such as ceilings or overhead wires when the swing arm is swung.

With respect to this problem, in Japanese Laid Open Patent Application JP-2004-182363-A, problems such as those described above are solved by providing a configuration wherein the swing arm telescopes during the swing so that the length thereof is reduced when in the upright posture. The center of swing of the swing arm is on the top of the vehicle, and the swing arm only swings up and down directly above the top of the vehicle, so that even if the length of the swing arm is increased, if the carrier is short, it is not possible for that carrier to hold long objects and if the vehicle is high, with respect to the length of the carrier, it is not possible to lower the carrier to a position at which objects can be removed.

The present invention is a reflection of the situation described above, and accordingly, an object of the present invention is to provide a novel lift device and a vehicle equipped with the same, capable of suitably lowering objects placed in a high position to a predetermined lower position that can be reached by people.

SUMMARY OF THE INVENTION

In order to achieve the aforementioned object, the present invention provides, in a first embodiment of the present invention, a vehicle equipped with a lift device for loading and unloading objects comprising:
 a link unit provided on a top of the vehicle; and
 a drive source for operating this link unit, the link unit comprising a telescoping arm that is disposed in a reclined posture on a top of the vehicle;
 a boom that is swung up and down on the top of the vehicle by the drive source;
 a slide beam that is moved by the swing movement of said boom, along the top of the vehicle, in the direction of a radius of swing of the boom;
 arm telescoping means for telescoping the telescoping arm in response to the swing movement of the boom, the telescoping arm comprising:
  a first arm member, having an end that is rotatably connected to a free end of the boom, and
  a second arm member that is mobile in the lengthwise direction of the first arm member, the first arm member being oriented upwards so as to be lowered while extending from the top of the vehicle, as a result of the swing movement of the boom; and
 an arm guide being provided at one end of the slide beam for guiding the first arm member in the lengthwise direction thereof when the telescoping arm is raised and lowered.

In a second embodiment of the present invention, a lift device is provided comprising:
 a link unit that is provided on a high surface; and
 a drive source for operating said link unit;
 the link unit comprising:
 a telescoping arm that is disposed in a reclined posture on a top of the vehicle;
 a boom that is swung up and down on the high surface by the drive source;
 a slide beam that is moved by the swing movement of this boom, along the high surface, in the direction of a radius of swing of the boom;
 arm telescoping means for telescoping the telescoping arm in response to the swing movement of the boom; the telescoping arm comprising a first arm member, having an end that is rotatably connected to a free end of the boom, and a second arm member that is mobile in the lengthwise direction of the first arm member, the first arm member being oriented upwards so as to be lowered while extending from the high surface, as a result of the swing movement of the boom; and
 an arm guide being provided at one end of the slide beam for guiding the first arm member in the lengthwise direction thereof when the telescoping arm is raised and lowered.

In a third embodiment of the present invention, the lift device according to the second embodiment described above is provided, wherein two link units are disposed parallel to each other with a predetermined space therebetween, each end of the booms in said link units being coupled to a drive shaft that is rotationally driven by the drive source; and a carrier frame for receiving an object being installed on the second arm members of the facing telescoping arms.

In a fourth embodiment of the present invention, the lift device according to the third embodiment above is provided, wherein the drive shaft comprises:

a main shaft for forward and reverse rotational drive directly coupled to the drive source; and a hollow shaft into which said main shaft is inserted, said hollow shaft comprising:

a first sleeve disposed on the drive source side, and a second sleeve that extends beyond an end of the main shaft in the axial direction thereof, the distal ends of the first sleeve and the second sleeve being rigidly attached to the ends of the booms in the two link units, and the proximal ends of the first sleeve and the second sleeve being rigidly attached to the outer circumference of the main shaft.

In a fifth embodiment of the present invention, the vehicle equipped with a lift device of the first embodiment, and the lift device of the second embodiment, are provided, further comprising a variable length telescoping arm, said telescoping arm comprising:

a first arm member; and a second arm member which is lowered while extending with the first arm member oriented upwards as a result of the swinging movement of the boom, whereby it is possible to suitably lower the second arm member to a predetermined lower position while reducing the swing radius of the boom.

In a sixth embodiment of the present invention, according to the first embodiment and second embodiment above, a slide beam is provided, which moves along the top of the vehicle or high surface in the direction of a swing radius of the boom as a result of the swing movement of the boom, comprising: a first arm guide provided at one end thereof for guiding the movement of the first arm member in the lengthwise direction, so as to prevent collisions with the vehicle or the like when the telescoping arm is raised or lowered.

In addition, because two link units comprising booms and the like are disposed parallel to each other, and a carrier frame is installed on the second arm members of the facing telescoping arms in these link units, it is possible to load and unload long objects in a sideways posture, by holding these long objects in the carrier frame.

Furthermore, the drive shaft that joins the ends of the booms in the two link units comprises a main shaft for forward and reverse rotational drive that is directly coupled to the drive source, and a hollow shaft into which this main shaft is inserted. This hollow shaft comprises a first sleeve disposed on the drive source side and a second sleeve that extends beyond an end of the main shaft in the axial direction thereof. The distal ends of the first sleeve and the second sleeve are rigidly attached to the ends of the booms in the two link units, and the proximal ends of the first sleeve and the second sleeve are rigidly attached to the outer circumference of the main shaft. Consequently, the torsional moment resulting from the swing of the booms is transmitted, by way of the first and second sleeves, from the proximal ends of the sleeves to the main shaft. Consequently, even if there is torsion in the main shaft as a result of the swing of the boom, a difference in the swing angles of the booms in the two link units relative to each other does not occur, so that spaced apart booms can be synchronously swung by a common drive source, using the long drive shaft.

BRIEF DESCRIPTION OF THE DRAWINGS

The above described features, aspects, and advantages of the present invention will be better understood with regard to the following description and accompanying drawings where:

FIG. 3 is a front view of a link unit, which is a component of the lift device;

DETAILED DESCRIPTION OF THE INVENTION

Figure 1:
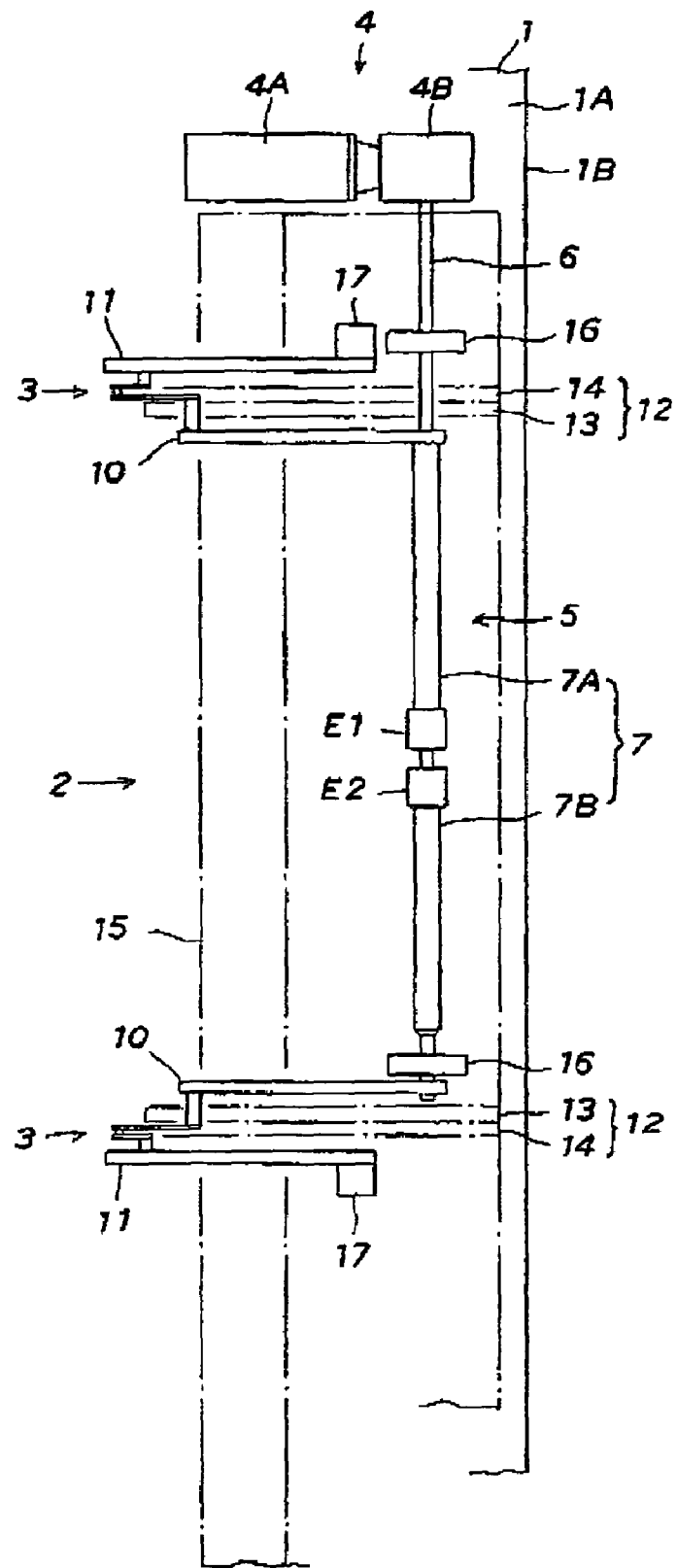
FIG. 1 is a partial plane view illustrating a vehicle equipped with a lift device according to the present invention.

Hereinafter the present invention will be described in further detail with reference to the drawings. FIG. 1 is a partial plane view illustrating a vehicle (and particularly a firefighting vehicle) provided with a lift device according to the present invention. In FIG. 1, reference numeral 1 indicates a box shaped vehicle, equipped with a lift device 2 on the top 1A thereof, for loading and unloading objects from one of the side faces 1B of the vehicle.

The lift device 2 comprises a pair of front and back link units 3, 3, which are disposed parallel to each other with a predetermined space therebetween in the front-back direction, on the top 1A of the vehicle, which is the high surface thereof, and a single drive source 4 for driving these link units 3, 3. The drive source 4 comprises a reversible drive motor 4A, and a reducer 4B for increasing the rotational torque thereof, and is disposed adjacent to one of the link units 3. Note that the motor 4A can be started and stopped remotely from the ground by way of a control switch, provided at the rear of the vehicle 1 or the like, which is not shown in the drawing.

A drive shaft 5 is rotationally driven forward and in reverse by the drive source 4. This drive shaft 5 comprises a main shaft 6, which is directly coupled to the drive source 4 (reducer 4B) and a hollow shaft 7, in which this main shaft 6 is inserted. In particular, the hollow shaft 7 comprises a first sleeve 7A, which is disposed on the drive source 4 side, and a second sleeve 7B, which extends in the axial direction, beyond the end of the main shaft 6. Each of the proximal ends E1, E2 of these sleeves 7A, 7B are rigidly attached to the outer circumference of the main shaft 6.

Figure 2:
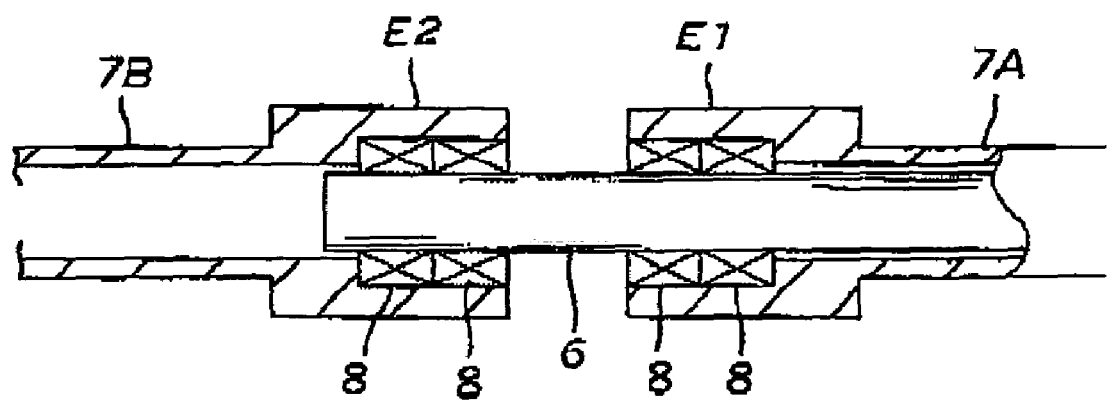
FIG. 2 is a partial cross-sectional view illustrating the structure of the drive shaft.

As shown in FIG. 2, the diameter of the openings of the proximal ends E1, E2 of both sleeves 7A, 7B are enlarged and well-known friction joints 8, 8, 8, 8, are provided at the interiors thereof, so that the ends E1, E2 of the sleeves 7A, 7B are rigidly attached to the outer circumference of the main shaft 4 by these friction joints 8, 8, 8, 8.

Returning now to FIG. 1, the link units 3 are linkage structures comprising a combination of a boom 10, which is swung up and down on the top 1A of the vehicle by the drive source 4, by way of the drive shaft 5, as well as a follow boom 11, which effects a predetermined movement in response to the swing movement of the boom 10, a telescoping arm 12 and the like. This telescoping arm 12 comprises a first arm member 13 and a second arm member 14, having predetermined lengths, and joined so as to be mobile with respect to each other in the lengthwise direction. Note that one end of the first arm member 13 is rotatably connected to the free end of the adjacently located boom 10, and a carrier frame 15 for receiving objects such as rescue ladders is installed on the facing second arm members 14, 14 of the two link units 3, 3.

Furthermore, one end of the boom 10 is coupled to the drive shaft 5. Consequently, if the drive source 4 is started, and the drive shaft 5 is driven forward or in reverse, the boom 10 swings up or down around the drive shaft 5 on the top 1A of the vehicle. Notably, as shown in FIG. 1, each end of the booms 10, 10 of the two link units 3, 3, are rigidly fastened to the distal ends of the first sleeve 7A and the second sleeve 7B, which are components of the drive shaft 5.

Thus, the torsional moment resulting from the swinging of the boom 10 acts on the drive shaft 5, and that torsional moment is transferred to the main shaft 6 by way of the first sleeve 7A and the second sleeve 7B, from the proximal ends E1, E2 thereof. Consequently, even if there is torsion in the main shaft 6 as a result of the swing of the boom 10, a difference in the swing angles of the booms 10, 10 in the two link units 3, 3 relative to each other does not occur, so that the spaced apart booms 10, 10 can be synchronously swung by a common drive source 4, using the long drive shaft 5.

Note that, in FIG. 1, the drive shaft 5 is rotatably supported by a bearing unit 16, and a bracket 17 supports one end of the follow boom 11, so that this swings in the same direction as the boom 10, in conjunction therewith.

Figure 3:
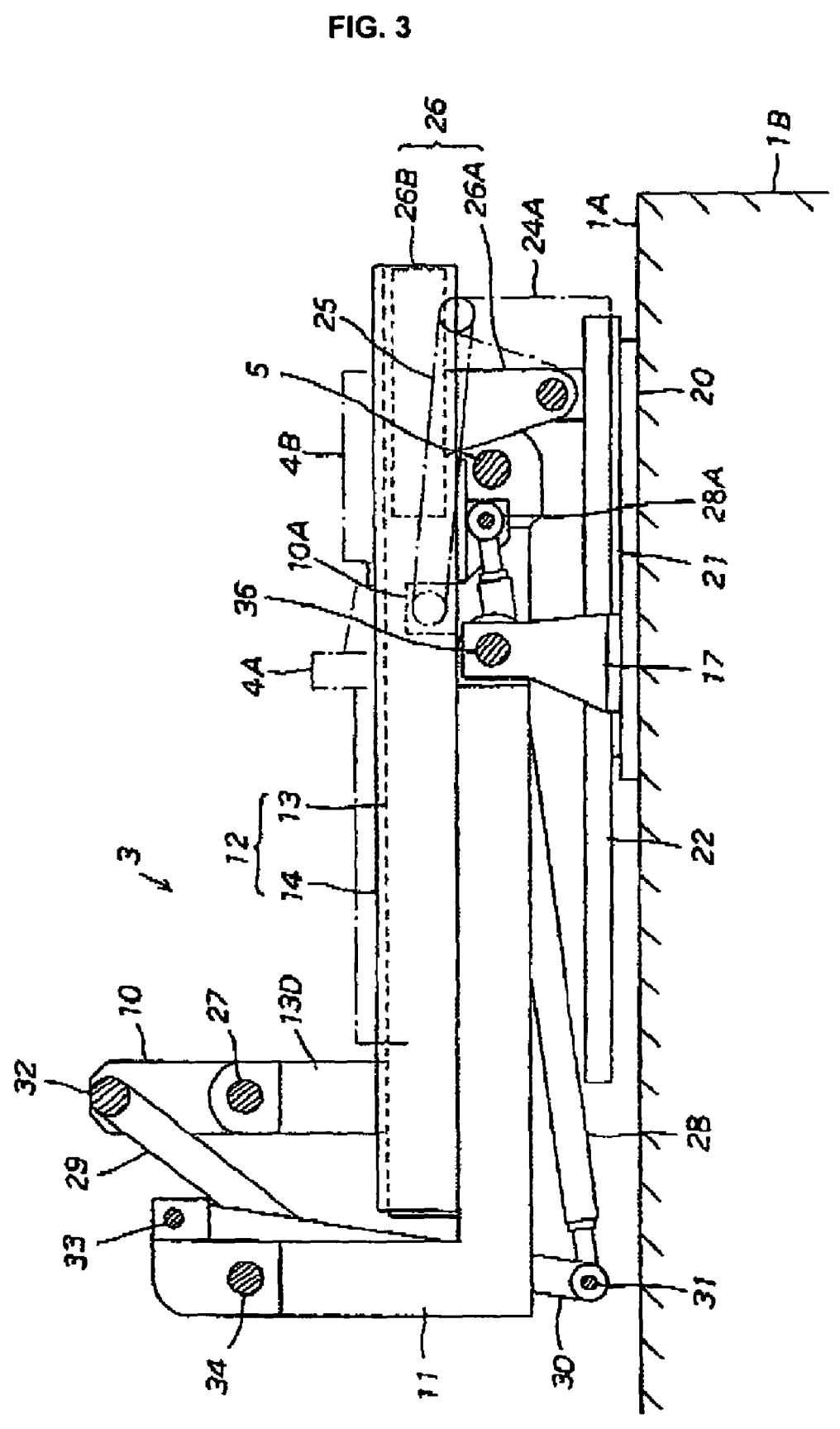
Figure 4:
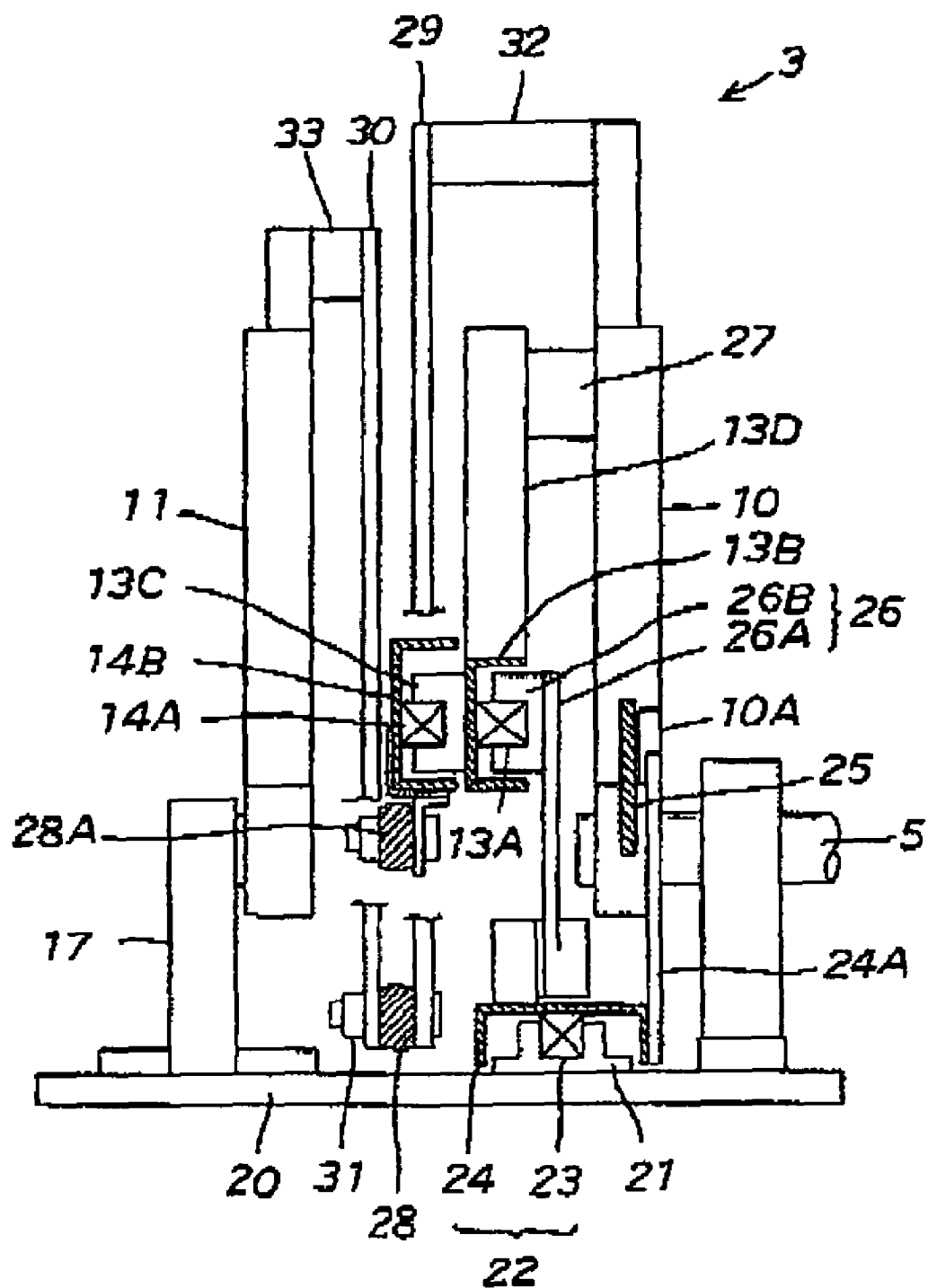
FIG. 4 is a side view of the link unit shown in FIG. 3.
Figure 5:
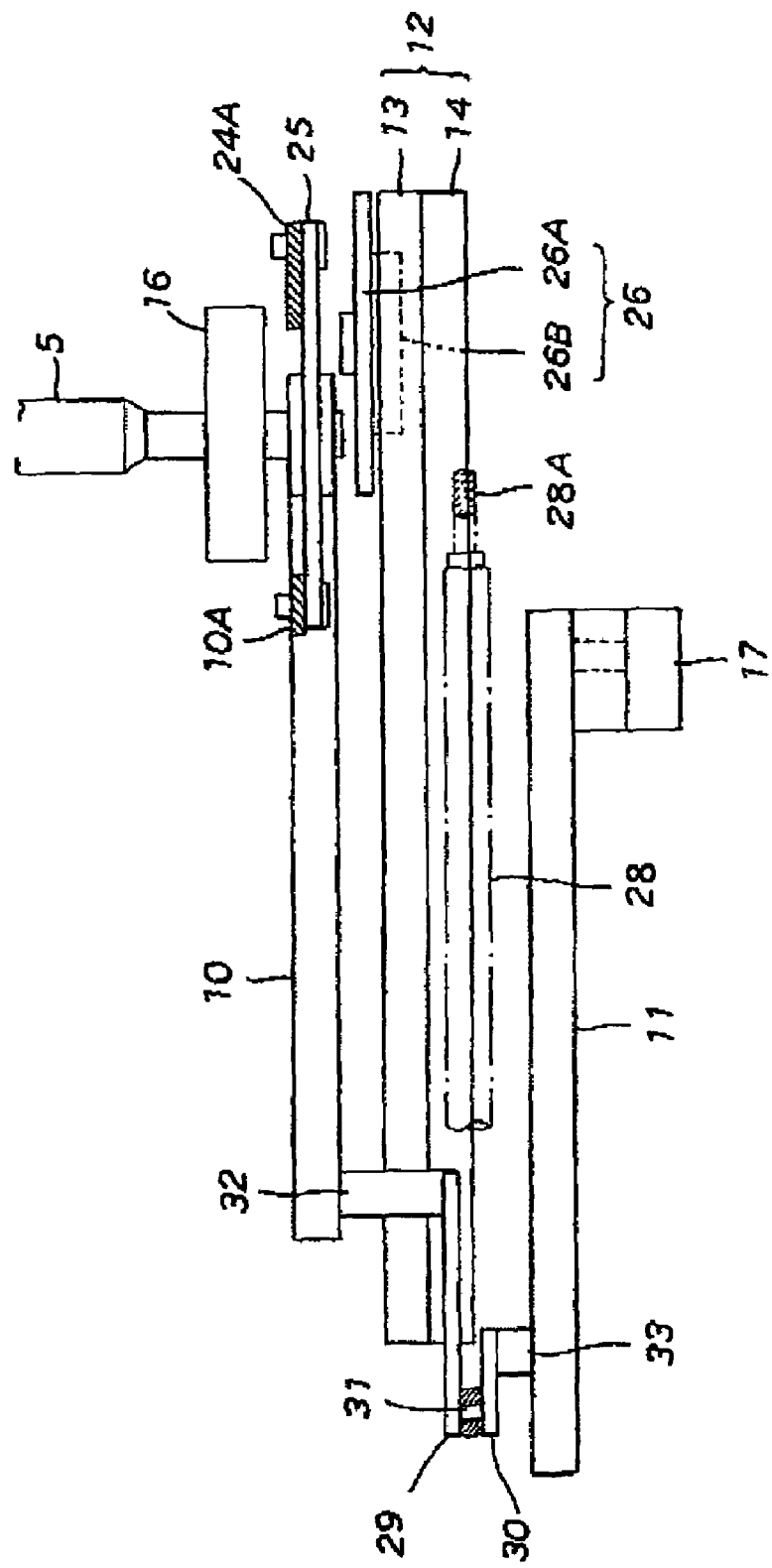
FIG. 5 is a plain view of the link unit shown in FIG. 3.
Figure 6:
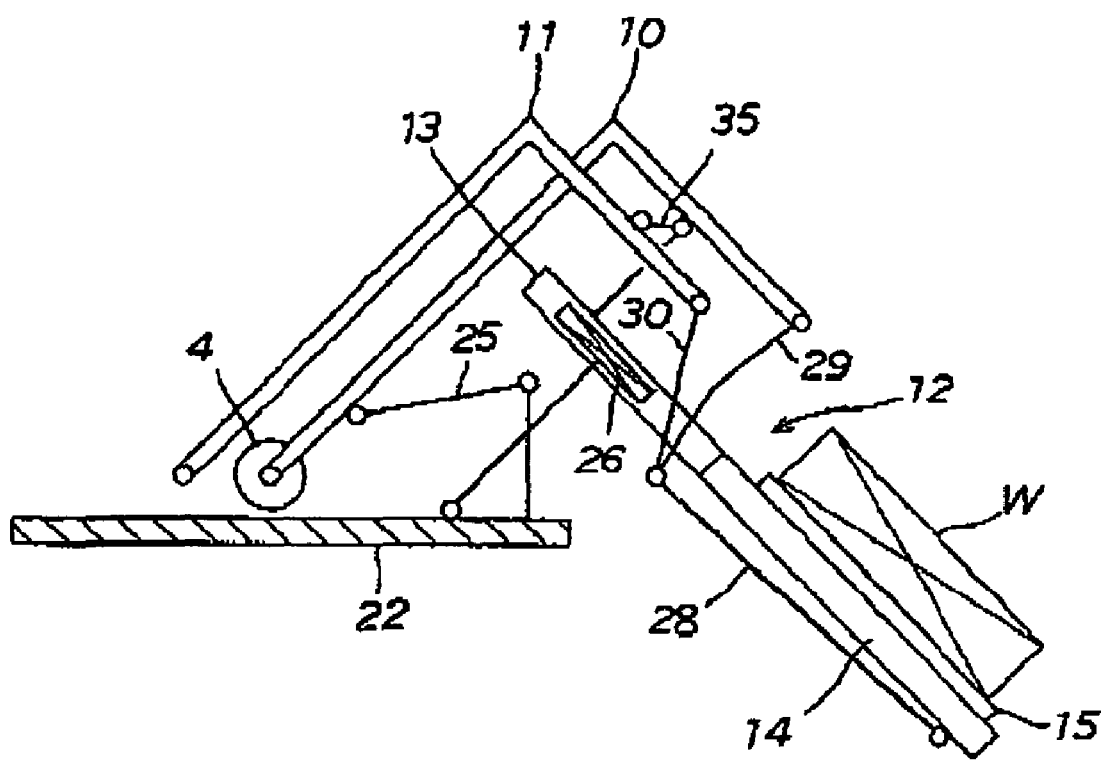
FIG. 6 is a schematic view of the link unit shown in FIG. 3, illustrating the structure thereof.
Figure 7:
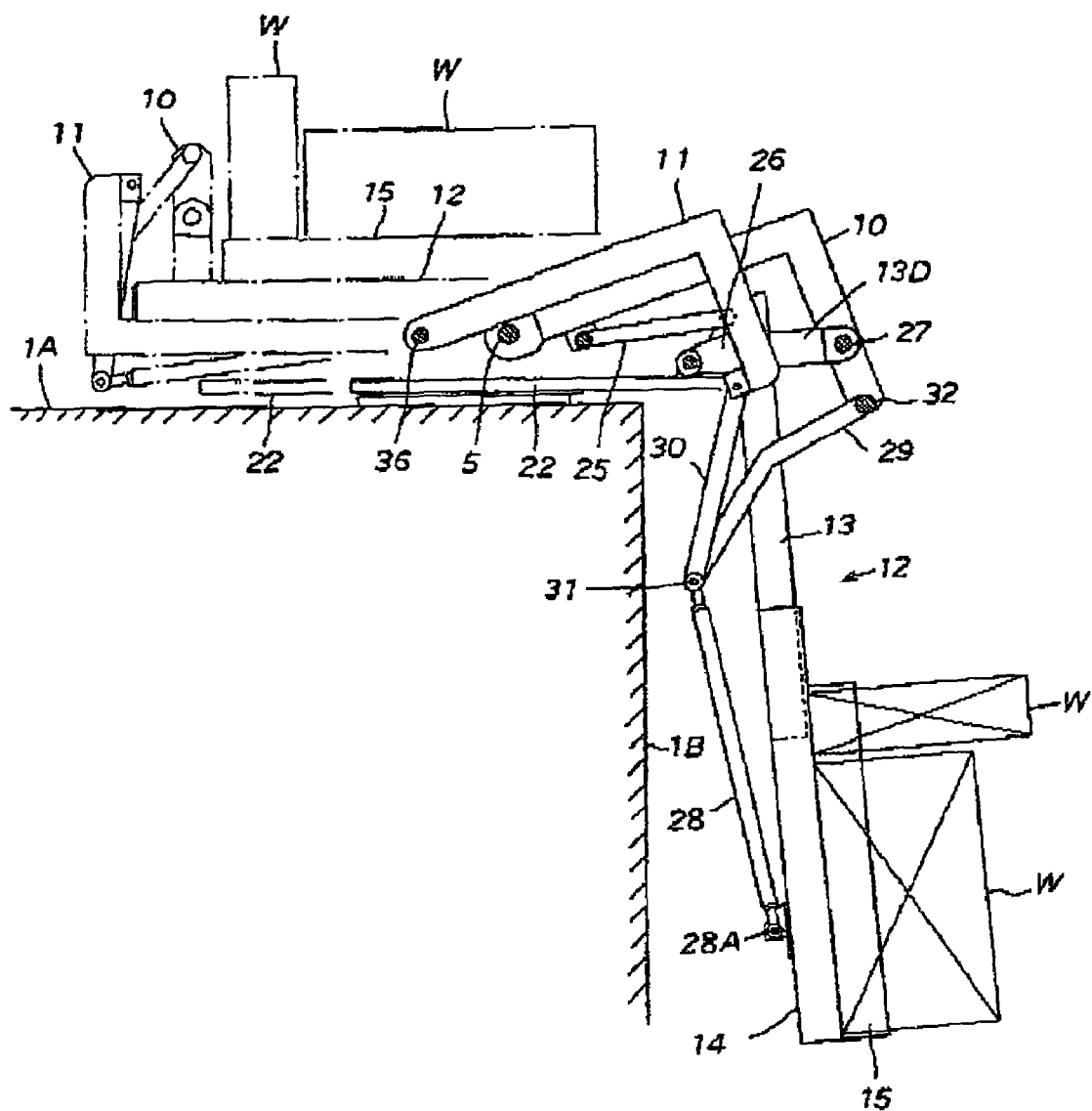
FIG. 7 is a schematic view of the link unit shown in FIG. 3, illustrating the operation thereof.

Next, the structure of the link units 3 will be described in more detail. Note that the two link units 3 have the same structures, and therefore in FIG. 3 through FIG. 7, only one link unit is shown and the structure of that one link unit is described. Here, FIG. 3 is a front view of the link unit and FIG. 4 is a side view illustrating a partial cutaway of the same link unit. FIG. 5 is a plain view showing the same link unit with a portion thereof omitted. FIG. 6 is a schematic view illustrating the structure of the same link unit in a simplified manner. FIG. 7 shows the same link unit in its operating state.

As shown in FIG. 3 and FIG. 4, a baseplate 20 is fixed on the top 1A of the vehicle. A linear guide block 21 is rigidly attached to this baseplate 20, and a slide beam 22 is provided so as to be able to slide along this linear guide block 21. The slide beam 22 comprises a mobile rail 23 which is supported slidably in the lengthwise direction of the linear guide block 21 (in this example, in the widthwise direction of the vehicle), and a main beam body 24, having a U-shaped sectional profile, which is rigidly attached to the mobile rail 23.

An upwardly extending bracket 24A is rigidly attached at the end of the main beam body 24. This bracket 24A is attached to a site on the boom 10 (the bracket 10A, shown in FIG. 3 through FIG. 5) by way of a link 25, whereby the slide beam 22 moves along the top of the vehicle 1A in the radial direction of the swing of the beam 10 (the widthwise direction of the vehicle) in response to the swinging motion of the boom 10.

Note that, in FIG. 3, the boom 10 is in the initial position, reclined on the top 1A of the vehicle, so that swinging is only possible in the clockwise direction. In this situation, when the boom 10 is swung in the clockwise direction in FIG. 3, the slide beam 22 moves to the right in FIG. 3, in conjunction therewith, and the end thereof extends horizontally beyond the side face 1B of the vehicle.

Furthermore, an arm guide 26 is provided on this main beam body 24 in the vicinity of the bracket 24A for holding the first arm member 13, which is a component of the telescoping arm 12, so that the telescoping arm can slide in the lengthwise direction. This arm guide 26 comprises a swing link 26A which is connected to the end of main beam body 24 and allows for swinging in the same direction as the boom 10, and a linear guide block 26B which is rigidly attached to the end of the swing link 26A, in such a manner that the first arm member 13 engages in the linear guide block 26B.

Here, the first arm member 13 is an elongate member comprising: a mobile rail 13A, which engages in the linear guide block 26B so that the movement thereof is guided in the lengthwise direction; a main arm body 13B, having a U-shaped sectional profile, which is rigidly attached to the mobile rail 13A; and a linear guide block 13C, which is rigidly attached to the main arm body 13B. A bracket 13D is rigidly attached at one end of the main arm body 13B, and extends orthogonally therefrom. This bracket 13D is swingably connected to the free end of the boom 10 by a pin 27.

Meanwhile the second arm member 14 is an elongate member comprising: a mobile rail 14A which is engaged by the linear guide block 13C of the first arm member 13, so this can slide in the lengthwise direction of the first arm member 13; and a main arm body 14B, having a U-shaped sectional profile, which is rigidly attached to this mobile rail 14A. One end 28A of a link 28 is connected to the main arm body 14B, at a position distant from the point of connection (pin 27) between the boom 10 and the first arm member 13.

Furthermore, the ends of two links 29, 30 are connected at the other end of the link 28 by a pin 31, the other end of the link 29 being connected to the end of the boom 10 by a pin 32 and the other end of the link 30 being connected to the end of the follow boom 11 by a pin 33. Thus, these links 28, 29 and 30, and the follow boom 11, move the second arm member 14 in the lengthwise direction of the first arm member 13 in response to the swinging motion of the boom 10, thus constituting arm telescoping means for telescoping the telescoping arm 12, which comprises both the arm members 13, 14.

Note that the boom 10 and follow boom 11, which are L-shaped, constitute parallel links, the free ends being connected at sites (the positions of the pins 27 and 34 shown in FIG. 3) by a link 35 (see FIG. 6). In other words, when the boom 10 swings up and down, with the drive shaft 5 acting as a pivot; the follow boom 11 swings in the same direction, while maintained parallel to the boom 10, with the point of connection 36 with the bracket 17, which is rigidly attached to the baseplate 20, as a pivot.

Next, the operation of the lift device having the configuration described above is described. With the telescoping arm 12 in the collapsed state (as indicated by the dotted and dashed line in FIG. 7), the telescoping arm is mounted in a reclined posture on the top 1A of the vehicle, and a predetermined object W (for example a long rescue ladder) is received by the carrier frame 15 that is fixed on the second arm member 14. Furthermore, the boom 10 and the follow boom 11 recline on the top 1A of the vehicle, and the slide beam 22 is accommodated within that area without protruding beyond the top 1A of the vehicle.

If the drive source 4 is started in this state and the boom 10 is swung from the dotted and dashed line position to the solid line position (as shown in FIG. 7) by the drive shaft 5, the slide beam 22 moves to the right in FIG. 7 along the top 1A of the vehicle by way of the link 25, and the end thereof extends from the top 1A of the vehicle, in the direction of the side face 1B. Meanwhile, the first arm member 13 of the telescoping arm is guided in the lengthwise direction by the arm guide 26, and rotates around the point of connection (pin 27) with the boom 10, so as to change from the reclined posture to an upright posture.

Furthermore, the telescoping arm 12 is gradually extended as a result of the second arm member 14 being moved in the lengthwise direction of the first arm member 13 by the following boom 11 and the links 28, 29 and 30, so as to be lowered from the top 1A of the vehicle, while the first arm member 13 is oriented upwards with respect to the second arm member 14. Thus, when the boom 10 swings as far as the terminal position (the solid line position in FIG. 7) the telescoping arm 12 is lowered along the side face 1B of the vehicle in the extended state and, at this point in time, it is possible to remove the object W from the second arm member 14 which extends below the first arm member 13 (or more specifically, from the carrying frame 15 that is fixed to the second arm member 14). Note that, in this example, the bottom end of the telescoping arm 12 stops in the vicinity of approximately 1 m above the ground, but this can also be allowed to touch the ground.

It should be noted that, with the telescoping arm 12 lowered from the top 1A of the vehicle, the telescoping arm 12 is prevented from rotating around the pin 27 by the arm guide 26, so that there is no risk of this wobbling and striking the side face 1B of the vehicle or the like. Meanwhile, in order to load the object W, that has been removed from a high location, on to the top 1A of the vehicle, the object W is fitted in the carrier frame 15 and fixed in place. Next, the drive source 4 is operated in reverse with respect to the steps described above, whereby each of the constituent elements of the link units 3 operate in a manner opposite to that described above, so as to return the lift device of the present invention to the disposition shown by the dotted and dashed line in FIG. 7.

In the foregoing, one embodiment of the present invention has been described, but the present invention is not limited to the embodiment described above. For example, in addition to firefighting vehicles, the present invention can be applied to trucks or freight cars. Furthermore, in addition to installing such a lift device 2 on the top of a vehicle, the present invention provides a lift device for placing objects on, and removing objects from, high surfaces such as shelves and the roofs of houses.

Furthermore, the present invention is not limited to two link units 3 that are disposed parallel to each other. A single link unit can be used; and the second arm member 14, which is a component of the telescoping arm 12, may hold small objects so as to load and unload them. Furthermore, rollers may be provided at the end of the slide beam 22 for the arm guide 26.

The invention claimed is:

1. A vehicle equipped with a lift device for loading and unloading objects from a top of the vehicle comprising:
   (A) a drive source; and
   (B) a link unit in connection with said drive source, comprising:
   (a) a linear guide block disposed on a top of the vehicle;
   (b) a slide beam comprised of:
      (i) a mobile rail in slidable communication with the linear guide block, in a lengthwise direction thereof; and
      (ii) a main beam body connected to the mobile rail;
   (c) a boom having a first end and a free end, the boom being in movable connection with said drive source at a first end thereof via the main beam body and capable of being swung up and down in relation to the top of the vehicle by said drive source;
   (d) a telescoping arm having:
      (i) a first arm member having a first end in rotatable connection with the free end of the boom, and a second end;
      (ii) a second arm member in movable connection with the second end of the first arm member, said second arm member being mobile with respect to the first arm member;
   (e) an arm guide, in connection with one end of said slide beam, for guiding the first arm member of the telescoping arm in the lengthwise direction thereof when the telescoping arm is raised and lowered, said arm guide comprising:
      (i) a swing link connected to the slide beam, so as to be able to swing the same direction as the boom; and
      (ii) a liner guide block attached to an end of the swing link, so as to engage the first arm member of the telescoping arm; and
   (e) arm telescoping means in communication with the free end of the boom and the second arm member of the telescoping arm, capable of telescoping the telescoping arm.

2. A lift device comprising:
(A) a drive source; and
(B) a link unit, in connection with said drive source so as to be operated thereby, 1 said link unit comprising:
   (a) a linear guide block;
   (b) a slide beam comprised of:
      (i) a mobile rail in slidable communication with the linear guide block, in a lengthwise direction thereof; and
      (ii) a main beam body connected to the mobile rail:
   (c) a boom having a first end and a free end, the boom being in movable connection with the drive source at a first end thereof via the main beam body, that is swung up and down on tho high surface by said drive source;
   (d) a telescoping arm having:
      (i) a first arm member having a first end in rotatable connection with the free end of the boom, and a second end,
      (ii) a second arm member in movable connection with the second end of the first arm member, said second arm member being mobile with respect to the first arm member,
   (e) an arm guide, in connection with one end of said slide bean, for guiding the first arm member of the telescoping arm in the lengthwise direction thereof when the telescoping arm is raised and lowered, said arm guide comprising:
      (i) a swing link connected to the slide beam, so as to be able to swing the same direction as the boom; and
      (ii) a linear guide block attached to an end of the swing link, so as to engage the first arm member of the telescoping arm and guide the movement thereof; and
   (e) arm telescoping means in communication with the free end of the boom and the second arm member of the telescoping arm, capable of telescoping the telescoping arm.

3. The lift device recited in claim 2, wherein two link units are disposed parallel to each other with a predetermined space therebetween, each end of the booms in each of said two link units being coupled to a drive shaft that is rotationally driven by the drive source; and
  a carrier frame for receiving an object provided on the second arm members of the facing telescoping arms.

4. The lift device recited in claim 3, wherein the drive shaft comprises:
  a main shaft for forward and reverse rotational drive that is directly coupled to the drive source; and
  a hollow shaft into which said main shaft is inserted, said hollow shaft comprising:
    a first sleeve disposed on the drive source side; and
    a second sleeve that extends beyond an end of said main shaft in the axial direction thereof,
  the distal ends of said first sleeve and said second sleeve being rigidly attached to the ends of the booms in the two link units, and the proximal ends of said first sleeve and said second sleeve being rigidly attached to the outer circumference of said main shaft.

\* \* \* \* \*